United States Patent
Johnson

(10) Patent No.: US 10,553,916 B2
(45) Date of Patent: Feb. 4, 2020

(54) JOHNSON AMBIENT HEAT ENGINE

(71) Applicant: Johnson IP Holding, LLC, Atlanta, GA (US)

(72) Inventor: Lonnie G. Johnson, Atlanta, GA (US)

(73) Assignee: Johnson IP Holding, LLC, Atlanta, GA (US)

( * ) Notice: Subject to any disclaimer, the term of this patent is extended or adjusted under 35 U.S.C. 154(b) by 36 days.

(21) Appl. No.: 15/643,709

(22) Filed: Jul. 7, 2017

(65) Prior Publication Data

US 2018/0013178 A1 Jan. 11, 2018

Related U.S. Application Data

(60) Provisional application No. 62/359,869, filed on Jul. 8, 2016.

(51) Int. Cl.
*H01M 10/46* (2006.01)
*H01M 10/44* (2006.01)
(Continued)

(52) U.S. Cl.
CPC ......... *H01M 10/443* (2013.01); *H01M 4/383* (2013.01); *H01M 10/36* (2013.01);
(Continued)

(58) Field of Classification Search
USPC .................... 320/101, 122, 124, 134, 150
See application file for complete search history.

(56) References Cited

U.S. PATENT DOCUMENTS 4,524,318 A * 6/1985 Burnham ................. G05F 3/30
323/313
5,148,099 A * 9/1992 Ong ......................... G05F 3/30
323/314
(Continued)

OTHER PUBLICATIONS

Lee et al., "An Electrochemical System for Efficiently Harvesting low-grade Heath Energy", Nature Communications, vol. 5, No. 3942, 6 pgs (May 2014).
(Continued)

*Primary Examiner* — Brian Ngo
(74) *Attorney, Agent, or Firm* — Panitch Schwarze Belisario & Nadel LLP

(57) ABSTRACT

An ambient heat engine that is thermally coupled to its environment is provided. The ambient heat engine includes two complementary electrochemical cells. One cell has a positive voltage temperature coefficient and the other cell has a negative voltage temperature coefficient. The ambient heat engine further includes a controller and an electrical energy storage device. When the ambient temperature increases or decreases, the temperature variation creates a voltage differential between the two cells, and the controller discharges the higher voltage cell and uses a portion of the discharged energy to charge the lower voltage cell. The difference in energy is extracted by the controller and supplied to the electrical energy storage device. The controller includes circuitry for coupling energy from the energy storage device to the cells in order to compensate for self-discharge of the cells which may occur due to electronic leakage and diffusion phenomenon over extended periods of time.

10 Claims, 11 Drawing Sheets

(51) Int. Cl.
*H01M 4/38* (2006.01)
*H01M 10/36* (2010.01)
*H02J 7/00* (2006.01)
*H01M 10/42* (2006.01)

(52) U.S. Cl.
CPC ......... *H01M 10/441* (2013.01); *H02J 7/0054* (2013.01); *H01M 2010/4271* (2013.01); *H02J 2007/0059* (2013.01)

(56) References Cited

U.S. PATENT DOCUMENTS

| | | | | |
|---|---|---|---|---|
| 5,339,018 | A * | 8/1994 | Brokaw | H02J 7/0091 320/147 |
| 5,666,046 | A * | 9/1997 | Mietus | G05F 3/267 323/313 |
| 6,899,967 | B2 | 5/2005 | Johnson | |
| 8,710,812 | B1 * | 4/2014 | Edwards | G05F 3/30 323/281 |
| 9,266,085 | B2 | 2/2016 | Johnson | |
| 2002/0037454 | A1 * | 3/2002 | Tsuruta | H01M 4/383 429/218.2 |
| 2002/0127441 | A1 * | 9/2002 | Johnson | H01M 14/00 429/11 |
| 2005/0134232 | A1 * | 6/2005 | Yamamoto | H01M 10/486 320/150 |
| 2009/0096421 | A1 * | 4/2009 | Seman, Jr. | H02J 7/0016 320/122 |
| 2013/0119967 | A1 * | 5/2013 | Kiuchi | G05F 3/30 323/313 |
| 2015/0108950 | A1 * | 4/2015 | Yun | H02J 7/0068 320/134 |
| 2015/0132615 | A1 * | 5/2015 | Yun | H01M 10/486 429/50 |
| 2016/0124456 | A1 * | 5/2016 | Baker | G05F 3/267 323/313 |

OTHER PUBLICATIONS

Hirschenhofer et al., "Fuel Cell Handbook", Fourth Edition, 28 pgs. (1999).

Gellender, M., "A proposed new energy source: The "mixing energy" of engine exhaust gas," Journal of Renewable and Sustainable Energy, vol. 2, pp. 023101-1-023101-14 (2010).

Joshi, Dr. Ashok V., "Thermoelectric Conversion with Ion Conductors," Final Report, Contract #N00014-86-C-0827, 40 pages (Jan. 1990).

Virkar et al., "Theoretical Assessment of an Oxygen Heat Engine: The Effect of Mass Transport Limitation," Energy Convers. Mgmt., vol. 32, No. 4, pp. 359-370 (1991).

* cited by examiner

JOHNSON AMBIENT HEAT ENGINE

CROSS-REFERENCE TO RELATED APPLICATIONS

This application claims priority to U.S. Provisional Patent Application No. 62/359,869, filed Jul. 8, 2016, the disclosure of which is herein incorporated by reference.

BACKGROUND OF THE INVENTION

The present invention relates to energy harvesting mechanisms for generating electrical power. More particularly, the present invention relates to a thermo-electrochemical device that converts heat energy from an environment in which the device is located into electrical power.

It has long been a goal to develop an engine that operates on thermal energy that is freely available in the ambient environment. Consistent with the second law of thermodynamics, prior attempts at such thermal-energy-harvesting devices required two distinct sources of thermal energy, namely, a heat source and a heat sink for supplying and removing heat, respectively, at different temperatures simultaneously. A heat-source and heat-sink pair having two distinct, spaced-apart temperatures typically does not occur naturally and/or plentifully, and thus is generally difficult to access. Therefore, because ambient heat at a single atmospheric temperature is more abundant and available than a simultaneous dual-heat source, a device for harnessing single-source ambient heat is more desirable than a device that requires a dual-heat source.

In U.S. Pat. No. 6,899,967, the present inventor disclosed a device that relies on cyclic temperature changes in the environment to produce the needed simultaneous dual-heat source. The needed temperature difference was artificially created by providing a mass of material that has significant heat capacity. The prior art device is a thermo-electrochemical converter that operates on a pressure difference between two metal-hydride chambers separated by a membrane electrode assembly (MEA). In the prior art invention, one metal-hydride chamber is exposed to the ambient environment, while the other is insulated and thermally stabilized. A thermal mass is coupled to the stabilized chamber to act as a heat source/sink material. Insulation may be used to thermally isolate the thermal-mass material from the environment in order to enhance the temperature difference produced. It absorbs heat and stores it during periods of elevated ambient temperature and releases that heat to function as an elevated-temperature heat source during periods of reduced ambient temperatures. As such, changes in the temperature of the insulated metal hydride coupled to the thermal mass will always lag temperature changes in its environment. Thus, a converter coupled between the thermal mass and the environment will be subjected to a simultaneous temperature differential needed for the device to operate.

A major limitation encountered with the prior art invention is associated with the need to have a device that is capable of scavenging power in a relatively efficient manner. A major limitation in achieving efficient operation is associated with the difficulty of creating a significant temperature difference between components. This is particularly true for a small device. The close proximity of the components in a small device allows for large parasitic heat conduction losses between the high and low temperature sections, which results in heat transfer between the two sections without performing power generation. This problem becomes particularly challenging when the rate of change in the environmental temperature is slow.

To eliminate the need for artificially creating a temperature differential, the present inventor disclosed in U.S. Pat. No. 9,266,085 an ambient heat engine (AHE) employing a heat source and heat sink that operates on the Sterling thermodynamic cycle and is consistent with the second law of thermodynamics. However, for the AHE, the heat source and heat sink do not occur simultaneously.

Ideally, the entire engine maintains a state of thermal equilibrium with its environment. It overcomes the limitation of past thermoelectric conversion systems by eliminating the need to maintain or create a simultaneous temperature differential across the device. The engine incorporates an electrochemical system for converting heat from its environment into electrical energy. The AHE operating principal is based on the thermo-galvanic effect wherein the voltage of an electrochemical cell is a direct function of its temperature and state of charge. The engine is driven by changes in temperature transients which occur in its ambient environment. The cell converts ambient heat into electricity by being charged at one temperature and voltage and then discharged at a different temperature and higher voltage.

A preferred embodiment is disclosed that employs hydrogen concentration electrochemical cells wherein voltage potentials are created using metal hydrides to apply hydrogen pressure differentials across proton conductive membrane electrode assemblies. However, the invention is equally applicable to other electrochemical cells having appreciable thermo-galvanic properties. A Copper Hexacyanoferrate (CuHCF) electrochemical cell is one alternate example. Gang Chen, Department of Mechanical Engineering at Massachusetts Institute of Technology, and Yi Cui, Department of Materials Science and Engineering at Stanford University & Stanford Institute for Materials and Energy Sciences SLAC National Accelerator Laboratory, reported use of a Copper Hexacyanoferrate (CuHCF) electrochemical cell to convert waste heat from industrial and other processes into electricity in NATURE COMMUNICATIONS|5:3942|DOI: 10.1038/ncomms4942|www.nature.com/nature communications.

The voltage of a thermo-galvanic electrochemical cell is a direct function of its temperature and state of charge. Thermo-galvanic cells convert heat into electricity by being charged at one temperature and voltage and then discharged at a different temperature and higher voltage. Use of thermos-galvanic cells for ambient energy harvesting is most attractive for applications where long term operation is needed and where periodic manual refueling of a power generator or replacement or recharge of batteries is not practical. Unfortunately, galvanic cells are subject to internal current leakage, molecular diffusion and other self-discharge mechanisms. Thus, it can be appreciated that a need exists for a device that produces electrical power using heat that is freely available from its ambient environment, and that overcomes the disadvantages and shortcomings of previous thermal converters that are subject to long term self-discharge and loss of effective operation.

BRIEF SUMMARY OF THE INVENTION

In one embodiment, the present invention relates to an electrochemical conversion system comprising first and second complementary rechargeable electrochemical cells, the first rechargeable electrochemical cell having a positive voltage temperature coefficient and the second rechargeable electrochemical cell having a negative voltage temperature coefficient; and a controller. A voltage differential is created between the first and second complementary rechargeable electrochemical cells upon a variation in a temperature of the system. The controller operates to extract power from the first and second complementary rechargeable electrochemical cells under the voltage differential created by the temperature variation.

In another embodiment, the present invention relates to an electrochemical conversion system comprising first and second complementary rechargeable electrochemical cells, the first rechargeable electrochemical cell having a first voltage temperature coefficient and the second rechargeable electrochemical cell having a second voltage temperature coefficient which is different from the first voltage temperature coefficient; an energy extraction circuit; and an energy storage device. A voltage differential is created between the first and second complementary rechargeable electrochemical cells upon a variation in a temperature of the system. The energy extraction circuit operates to extract power from the first and second complementary rechargeable electrochemical cells under the voltage differential created by the temperature variation and supply the extracted power to the energy storage device. The energy extraction circuit periodically recharges each of the rechargeable electrochemical cells using energy from the energy storage device

DETAILED DESCRIPTION OF THE INVENTION

Figure 1:
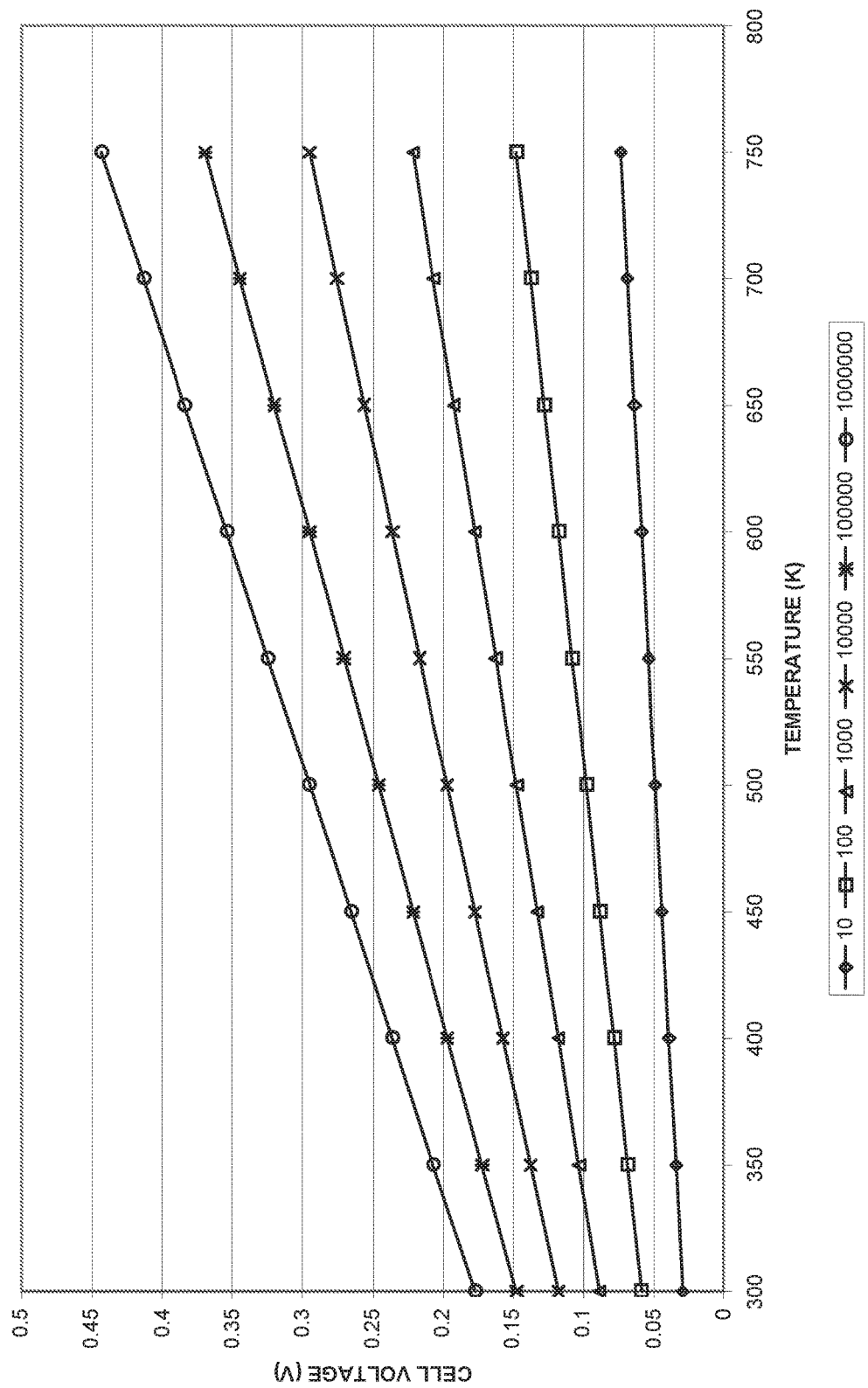
FIG. 1 is a plot showing the voltage potential of a proton-conductive Membrane-Electrode Assembly (MEA) cell as a function of temperature for selected ranges of hydrogen pressure ratios across the MEA, in accordance with an embodiment of the present invention.

Embodiments of the present invention are described herein. The disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, at least some specific structural and functional details disclosed herein are not to be interpreted as limiting, but merely as a basis for the claims and as a representative basis for teaching one skilled in the art to variously employ the present invention.

The Johnson Ambient-Heat Engine (JAHE), an electrochemical conversion system, uses thermal transients that naturally occur in its ambient environment to generate electrical power. Specifically, the JAHE is an apparatus that is powered by thermal transients in its environment. It utilizes thermodynamic principles of heat engines and thermo-galvanic electrochemical-cell principles in combination to generate electrical energy.

The term "ambient" in the context of the present invention is considered to mean heat from the environment where the device is located, open air or an enclosed space. In a "local sense," the ambient environment is any enclosure wherein the present invention is subjected to the temperature level and temperature transients occurring in the enclosure. Applicable enclosures include, but are not limited to, a building, a room in a building structure, or a compartment or enclosure in close proximity to a combustion engine. A local ambient environment also encompasses a combustion engine (or other heat-producing instrumentality) itself. The present invention may be mounted upon such ambient environment. In a more general sense, the ambient environment may be the atmosphere of the great outdoors wherein thermal energy and temperature transients are provided by the sun.

The apparatus of the present invention performs through a combination of thermodynamic processes and complementary electrochemical reactions. The phrase "electrochemical conversion system" is be used throughout the present application to generally refer to the present invention. The present invention also may be considered an "energy harvester," and more particularly may be considered a "thermal energy harvester." Thus, the present invention, as disclosed herein, may be referred to alternatively as the Johnson Ambient-Heat Engine, an electrochemical conversion system and an energy harvester.

A preferred embodiment employs hydrogen concentration cells as galvanic cells, wherein voltage potentials, that are a function of temperature, are created using metal hydrides applying hydrogen pressure differentials across the proton conductive membrane electrode assembly (MEA). However, the present invention is equally applicable to other electrochemical cells having appreciable thermo-galvanic properties. A hydrogen concentration cell is discharged to produce power by allowing hydrogen to expand from the high-pressure side into the low-pressure side of the MEA. Conversely, the cell can be recharged by applying power to the MEA to pump hydrogen from its low pressure side to its high pressure side. Returning the hydrogen to the high-pressure side requires the same amount of current as that generated when it transitioned to the low-pressure side of the MEA. However, less energy is required since the hydrogen is returned during periods when the voltage of the electrochemical conversion system is low. The difference in energy produced during expansion versus compression is retained within the converter or a separate electrical-energy storage device and is available for supply to an external load.

The present invention improves on the prior art by providing an ambient energy harvester that employs two complementary thermos-galvanic electrochemical cells wherein one cell has a positive voltage temperature coefficient and the other has a negative voltage temperature coefficient, whereby a voltage differential is created between the two cells with an increase or decrease in temperature. The present invention further includes recharge circuitry that compensates for self-discharge effects due to electronic leakage, diffusion or other loss mechanisms occurring during long term maintenance free operation.

The Ambient Heat Engine (AHE) operating principal is based on the thermo-galvanic effect wherein the voltage of an electrochemical cell is a direct function of its temperature and state of charge. A pair of complementary cells, one with a positive temperature-voltage coefficient and the other with a negative temperature-voltage coefficient, will produce a temperature differential with a change in temperature. The cells convert heat into electricity by being charged and discharged at different temperatures. A preferred embodiment employs hydrogen concentration cells wherein voltage potentials are created using metal hydrides applying hydrogen pressure differentials across proton conductive membrane electrode assemblies. However, the present invention is equally applicable to other electrochemical cells having appreciable thermo-galvanic properties.

Ideally, the various components, comprising the thermo-electrochemical converter, are tightly coupled thermally, such that all of the components are maintained at or near a single uniform temperature. Ideally, the uniform temperature is the temperature of the environment existing at the time when expansion and compression or charge and discharge events occur. As a given metal-hydride bed undergoes the endothermic process of releasing hydrogen or the exothermic process of absorbing hydrogen, heat is conducted between it and other components in order to maintain the relatively uniform temperature. As hydrogen is compressed or expanded through the MEA, heat is removed or supplied respectively so as to maintain the uniform temperature. The net thermal energy needed or removed in order to maintain the temperature of the overall system (including MEA, cells, hydrides and hydrogen) as hydrogen expands or undergoes compression, respectively, is thermal energy supplied to or from the environment. It is energy in the environment of the converter that is exchanged between the environment and the high and low pressure metal hydrides. This thermal energy from the environment is considered "ambient" thermal energy.

The open-circuit electrical potential due to a hydrogen pressure differential across a proton-conductive membrane electrode assembly (MEA) is a linear function of temperature and proportional to the natural logarithm of the hydrogen pressure ratio and can be calculated using the Nernst equation (*Fuel Cell Handbook*, Fourth Edition, 1999, by J. H. Hirschenhofer, D. B. Stauffer, R. R. Engleman, and M. G. Klett, at pp. 2-5):

$$V_{OC} = RT/2F \ln(P_{Hi}/P_{Low}) \qquad \text{Equation 1}$$

In Equation 1, $V_{OC}$ is open circuit voltage, R is the universal gas constant, T is the cell absolute temperature in degrees Kelvin, F is Faraday's constant, $P_{Hi}$ is the hydrogen pressure on the high-pressure side and $P_{Low}$ is the hydrogen pressure on the low-pressure side.

FIG. 1 shows the voltage across a proton conductive MEA as a function of temperature as calculated using the Nernst equation for selected hydrogen pressure ratios. For a given pressure ratio, the MEA voltage is high when the temperature is high and the MEA voltage is low when the MEA temperature is low.

Figure 2:
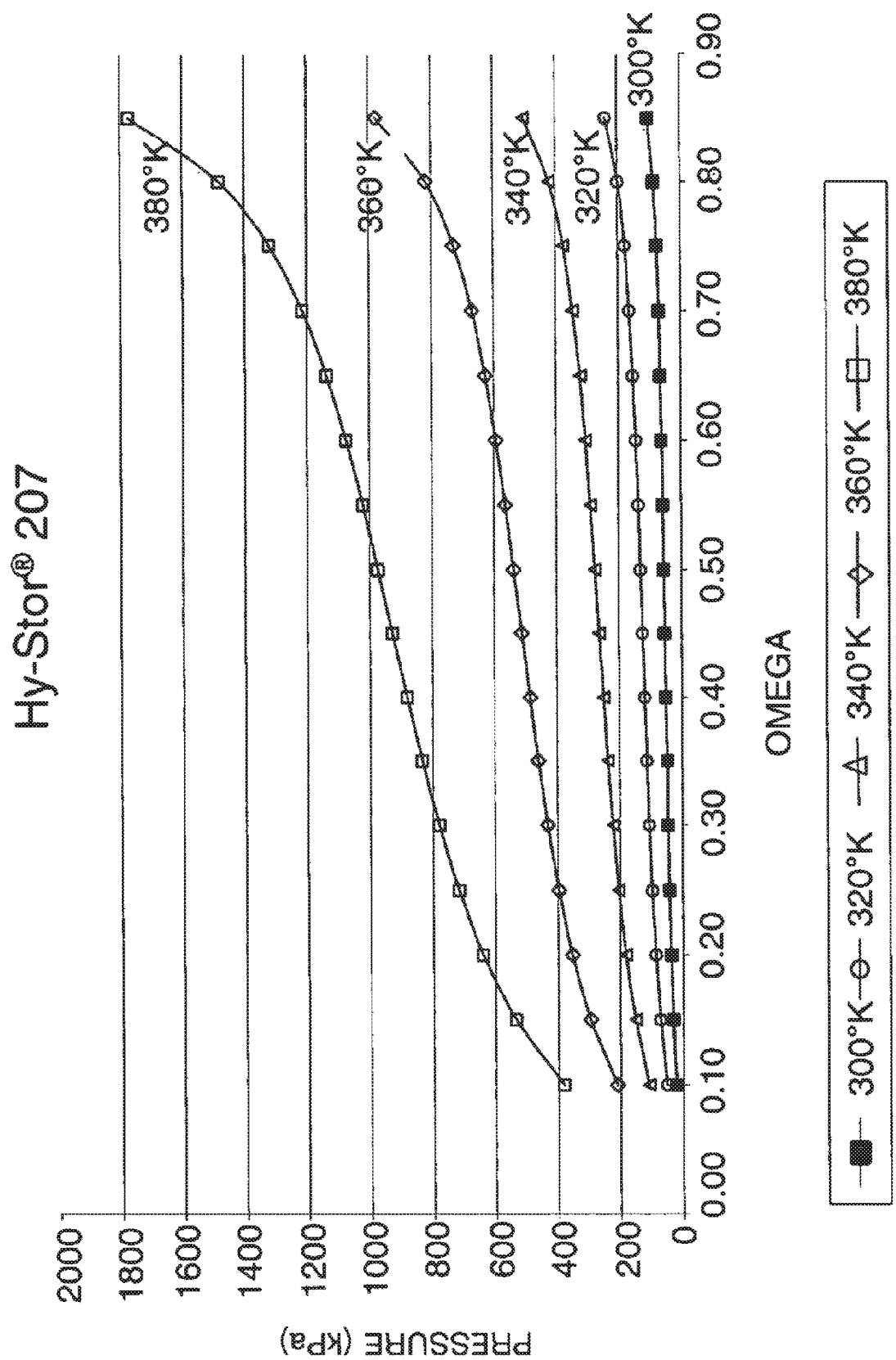
FIG. 2 is a plot showing hydrogen pressure as a function of hydrogen content and temperature for a representative type and brand of metal hydride at selected temperatures, in accordance with an embodiment of the present invention.

Metal hydrides are metallic substances that are capable of absorbing hydrogen gas when exposed to the hydrogen gas at certain pressures and temperatures. The pressure of hydrogen contained by a metal-hydride depends on its temperature and hydrogen content. Referring now to FIG. 2, a data plot shows the pressure and temperature relationship versus hydrogen content for an exemplary metal hydride. This particular chart is for a metal hydride commercially marketed as Hy-Stor® 207 that has a chemical formula $LaNi_{4.7}Al_{0.3}$. The product is believed to be sold and distributed by Hera USA Inc. OMEGA, the quantity along the x-axis, is H/M, the ratio of the atomic fraction of hydrogen in the metal hydride relative to the maximum amount of hydrogen that the hydride can absorb. As can be seen from the data plot, metal hydrides exhibit pressure plateaus that are a function of temperature whereby, at a given temperature, the majority of the hydrogen is stored or released with minimal change in pressure. The pressure level of the plateau increases with increasing temperature. The "midpoint pressure" for a given temperature is defined as the pressure at which the hydride contains 50% (i.e., 0.50) of its storage capacity. The midpoint pressure may be used as a representative value for comparison of pressures of different hydrogen-ladened metal-hydride materials at a given temperature.

Ideally, if the pressure of the hydrogen gas rises above the equilibrium pressure, then hydrogen will be absorbed into the metal hydride. Absorption is exothermic and thus heat will be released during the process. If sufficient heat is not transferred away from the metal hydride to support continued hydrogen absorption at a stable temperature, then the temperature will increase to a point where a new, higher equilibrium pressure state is attained and absorption stops. On the other hand, if the pressure of hydrogen gas drops below the equilibrium pressure, hydrogen gas will be released from the hydrogen-ladened metal-hydride material. The hydrogen-release process is endothermic since heat input is required to maintain the desorption process. If sufficient heat is not available to support continued hydrogen evolution at a stable temperature, then the temperature will drop to a point where a new lower equilibrium pressure is attained and hydrogen release stops. In practice, for a given material, the equilibrium pressures and temperatures for absorption are different from the equilibrium pressures and temperatures for desorption by finite amounts. This difference is generally referred to as the hysteresis property of the material and must be accounted for by appropriately selecting metal hydrides for use in the JAHE.

Figure 3:
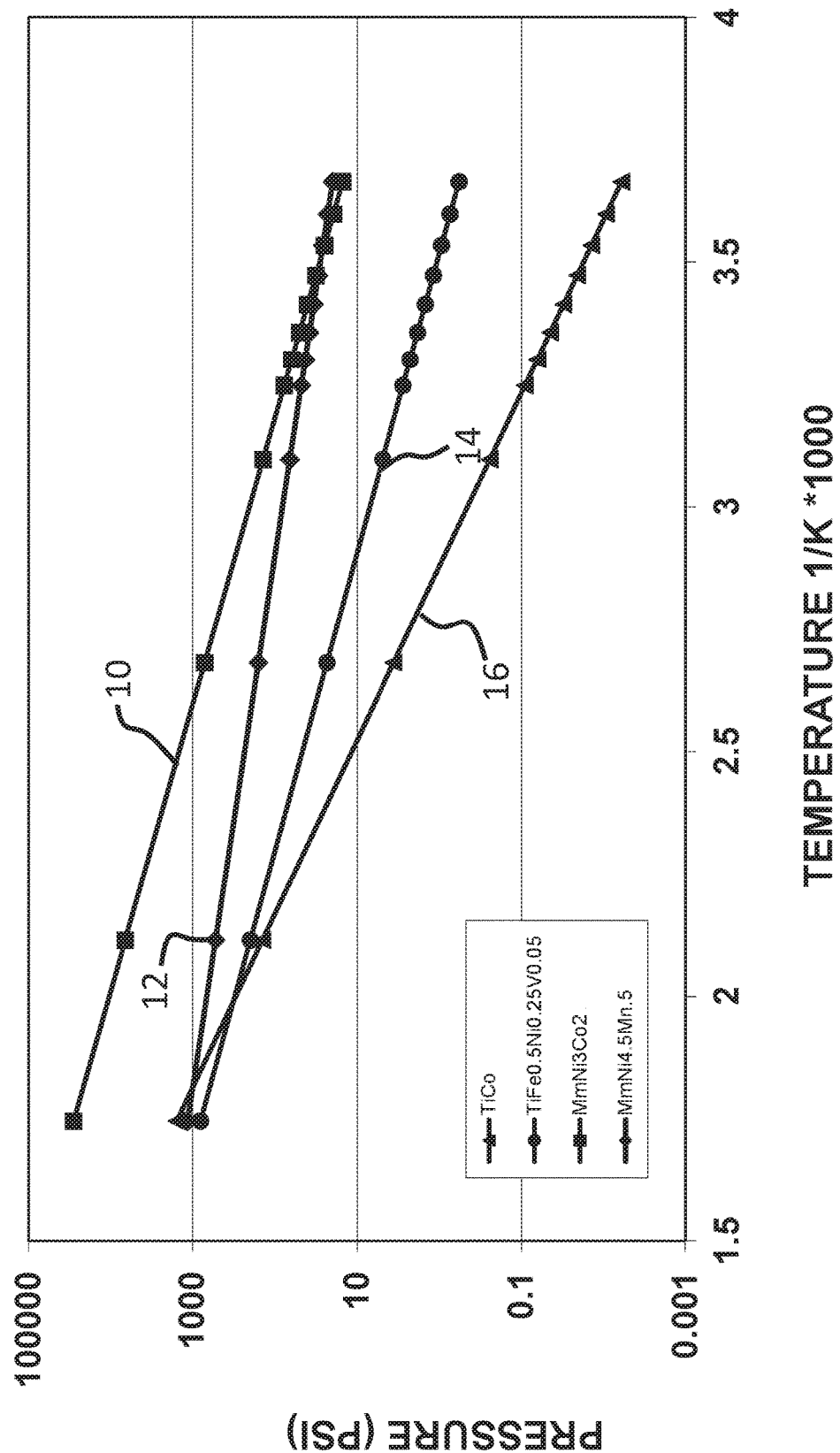
FIG. 3 is a data plot showing midpoint hydrogen pressure as a function of temperature for selected representative metal hydrides suitable for use in an electrochemical conversion system in accordance with an embodiment of the present invention.

Selected metal hydrides can be paired together as high-pressure and low-pressure reservoirs for optimum performance in the ambient-heat engine application. Referring now to FIG. 3, therein is shown a plot of the variation of the midpoint pressure versus temperature for several selected commercially available metal hydrides. The graph shows mid-point pressures for TiCo (line 16), $TiFe_{0.5}Ni_{0.25}V_{0.05}$ (line 14), $MmNi_{4.5}Nm_{0.5}$ (line 12) and $MmNi_3Co_2$ (line 10). These products are believed to be sold and distributed by GfE Gesellschaft fur Elektrometallurgie mbH Ltd. Liab. Co, a subsidiary of AMG Advanced Metallurgical Group N.V. The data provided by the metal hydride suppliers indicate that the midpoint pressures of some of the metal hydrides converge towards each other with increasing temperature whereas others diverge.

Figure 4:
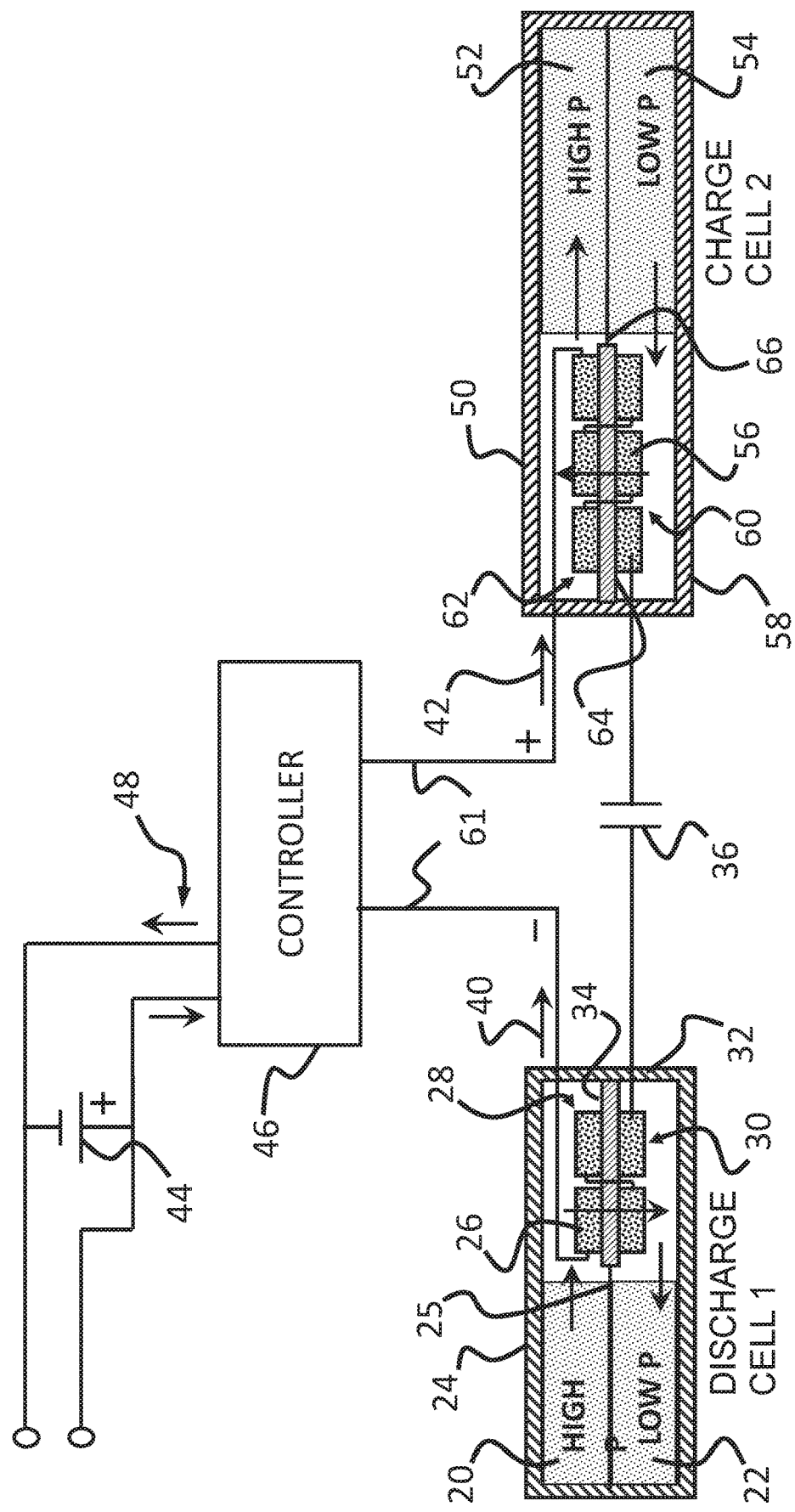
FIG. 4 is a schematic illustration of a representative example of one embodiment of the present invention that includes an energy extraction circuit (controller) and complementary thermo-galvanic cells connected back to back to each other in an electrochemical conversion system operating under an elevated ambient temperature condition at 30° C.

FIG. 4 is a schematic representation of the present invention. The system includes first and second electrochemical cells 32 and 58 electrically connected in reverse polarity, "back to back" (i.e., high pressure terminal to high pressure terminal and low pressure terminal to low pressure terminal), with the controller 46 connected between the negative terminals. Further, the two electrochemical cells 32, 58 are complementary, wherein the metal hydride combination in electrochemical cell 32 yields a positive temperature-voltage coefficient and the metal hydride combination in electrochemical cell 58 results in a negative temperature-voltage coefficient. As such, a voltage differential is created between the two cells 32, 58 with an increase or decrease in temperature. Cell 32 includes a thermally-conductive housing 24 which encloses a high-pressure chamber 20 and a low-pressure chamber 22 that are separated from one another by a substantially gas-impermeable barrier 25. A MEA 26 forms at least a portion of the substantially gas-impermeable barrier 25. In the embodiment of FIG. 4, the MEA 26 of the electrochemical cell 32 is formed of electrodes 28 and 30 grouped in pairs that sandwich an electrolyte membrane 34. The electrode pairs are electrically connected in series with each other to achieve useful levels of voltage output. The number of pairs shown in FIG. 4 is only representative, not restrictive, and is intended to indicate that there can be more than one electrode pair. The electrolyte membrane 34 is substantially impermeable. In this example, cell 32 employs $MmNi_3Co_2$ as its high pressure metal hydride 20 and $TiFe_{0.5}Ni_{0.25}V_{0.05}$ as its low pressure metal hydride 22.

Electrochemical cell 58 includes thermally-conductive housing 50 enclosing a high-pressure chamber 52 and a low-pressure chamber 54 that are separated from one another by a substantially gas-impermeable barrier 66. A MEA 56 forms at least a portion of the substantially gas-impermeable barrier 66. In the embodiment of FIG. 4, the MEA 56 of the electrochemical cell 58 is formed of representative electrodes 60 and 62 grouped in pairs that sandwich an electrolyte membrane 64. The electrode pairs are electrically connected in series with each other to achieve useful levels of voltage output. The electrolyte membrane 64 is substantially impermeable. The electrochemical cell 58 employs $TiFe_{0.5}Ni_{0.25}V_{0.05}$ as a high pressure metal hydride in chamber 52 and TiCo as a low pressure metal hydride in chamber 54.

In this embodiment, at a nominal ambient temperature of 25° C. and a hydrogen content of 50% of their capacity, the metal hydride pair in cell 32 provides a pressure ratio of approximately 37 and the metal hydride pair in cell 58 provides a pressure ratio of approximately 26. Because of the difference in pressure ratio at the nominal temperature, cell 58 is configured having a greater number of MEAs connected in series than cell 32, so that that the two cells 32, 58 will have nearly equivalent voltages at the nominal ambient temperature of operation. The high-pressure and low-pressure metal hydride materials have been selected such that at any given temperature, the hydrogen storage pressure of the high-pressure storage medium will always be greater than that of the low-pressure storage medium in each cell 32, 58.

The energy harvesting, electrical power generation process may begin at an ambient environmental temperature of 20° C., with the first cell 32 being in a charged state wherein the hydrogen within the first cell 32 is substantially on the high pressure side of the cell 32 with the low pressure metal hydride substantially depleted, and with the second cell 58 being in a discharged state wherein the hydrogen contained in the second cell 58 is substantially contained in the low pressure chamber 54 and the high pressure chamber 52 is substantially depleted of hydrogen. As such, the first cell 32 will be at a greater voltage potential because of its higher hydrogen pressure ratio and the difference in voltage potential between the two cells 32, 58 will be applied to the controller 46 across terminals 61.

When controller 46 closes the circuit, it supplies power to an energy storage device 44 as current flows under the voltage differential applied to the controller 46 across terminals 61 (FIG. 4). The first cell 32, which discharges as hydrogen under pressure, is conducted from the high-pressure chamber to the low-pressure chamber. Hydrogen released from the high pressure metal hydride undergoes oxidation at the interfaces of the high-pressure electrodes 28 and the electrolyte membrane 34. Electrons are conducted through the circuit as the hydrogen ions (protons) are conducted through the electrolyte membrane 34. At the interfaces of the low pressure electrodes 30 to the electrolyte membrane 34 in the low-pressure chamber 22, the hydrogen ions being conducted through the membrane 34 combine with the electrons conducted through the closed circuit to "reconstitute" hydrogen molecules. The hydrogen reconstituted in the low-pressure electrodes 30 exits the electrodes 30 and becomes substantially absorbed within the low pressure hydrogen-storage medium disposed within the low-pressure chamber 22, as the low pressure hydrogen storage medium functions to maintain a low-pressure within the chamber 22.

Simultaneously with the discharge of cell 32, hydrogen contained in the second cell 58 is pumped to the high-pressure chamber 52 from the low-pressure chamber 54 as the voltage of the first cell 32 is of sufficient magnitude to force reverse current flow against voltage potential of the MEA 56 of the second cell 58. In the second cell 58, hydrogen is conducted from the low-pressure chamber 54 to the high-pressure chamber 52. Under the reverse current, electrons are stripped from hydrogen in the low-pressure chamber 54 at the interfaces of the low-pressure electrodes 60 and the electrolyte membrane 64 and combines with protons in the high-pressure chamber 52 at the interfaces of the high pressure electrodes 62 and the electrolyte membrane 64 as the protons are conducted through membrane 64. Hydrogen is desorbed from the low pressure metal hydride in low pressure chamber 54 and absorbed by the high pressure metal hydride within high pressure chamber 52.

Figure 5:
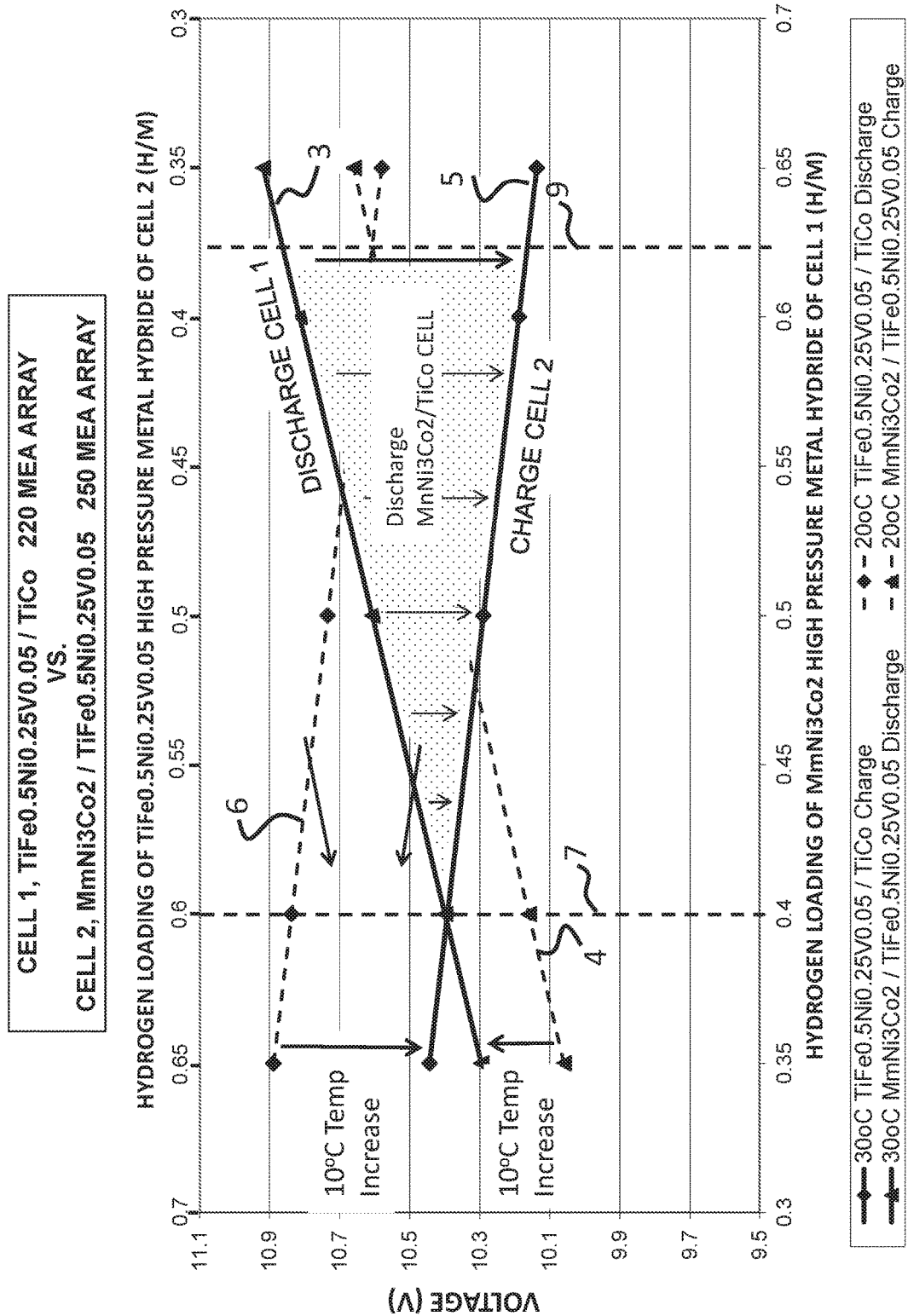
FIG. 5 is a data plot of Nernst voltage, a function of hydrogen content for a first metal hydride based electrochemical cell and a second metal hydride based electrochemical cell connected back to back to each other, wherein the high and low pressure metal-hydride pairs in each cell are selected based upon predicted, advantageous pressure differentials under an elevated ambient temperature condition, in accordance with an embodiment of the present invention.

Referring now to FIG. 5, there is shown a voltage plot of the first and second electrochemical cells 32 and 58 versus the hydrogen content of the high pressure metal hydrides on the high pressure sides of two hydrogen concentration cells. It will be understood that the below description of the meaning of the different states and lines of Fi. 5 are equally applicable to FIG. 7.

Referring to FIG. 5, the first cell 32 contains an array or stack of 220 MEAs and cell 58 contains an array or stack of 250 MEAS. The MEAs within each cell are electrically connected in series. The pressure ratios at the mid-point pressures of the metal hydrides within the first cell 32 results in an individual MEA voltage of 0.0468 V whereas, under the same condition, the individual MEA voltage of cell 58 is 0.0424 V. The number of MEAs in each cell is selected so that the cells will have complementary operating voltage ranges as illustrated in FIG. 5. At 30° C., under the starting conditions of cell 32 being charged (i.e., referred to as Discharge Cell 1 in FIGS. 4-5) and cell 58 being discharged (i.e., referred to as Charge Cell 2 in FIGS. 4-5) at the hydrogen content state represented by dotted line 9, the two cells 32, 58 display a differential voltage of about 0.64 volts. Line 3 and dotted line 4 show the decrease in voltage of the first cell 32 as hydrogen leaves the high pressure metal hydride 20 and transitions to the low pressure metal hydride 22. Line 3 shows the voltage profile of cell 32 at 30° C. and dotted line 4 shows the profile at 20° C. Similarly, lines 5 and 6 show the decrease in voltage as hydrogen leaves the high pressure metal hydride 52 and transitions to the low pressure metal hydride 54 of the second cell 58. Dotted line 6 shows the voltage profile for the second cell 58 at 20° C. and solid line 5 shows the profile at 30° C.

FIG. 4 and solid lines 3 and 5 of FIG. 5 represent a starting condition of the converter after a 10° C. temperature increase to 30° C. has occurred. As indicated by the hydrogen content state represented by dotted line 9, the temperature change (voltage change from line 4 to line 3) has caused the first cell 32 to be at a higher voltage than the second cell 58 (voltage change from line 6 to line 5). Power is generated with the discharge of the first cell 32, line 3, as hydrogen is conducted through MEA array 26 from high pressure metal hydride 20 to low pressure metal hydride 22. The power produced by the first cell 32 drives the compression process ongoing in second cell 58. The second cell 58, line 5, is charged as hydrogen is pumped from the low pressure metal hydride 54 through MEA array 56 to the high pressure metal hydride 52. The difference in power produced by the first cell 32 versus that consumed in the compression process in the second cell 58 is extracted by the controller 46 and supplied to the external energy storage device 44, after inefficiency losses. The controller 46 enables current flow between the two cells 32, 58 as indicated by the electron flow direction arrows 40 and 42 in FIG. 4. The controller extracts power at the voltage differential between the two cells 32, 58. The current flow terminates when the voltage difference between the two cells 32, 58 is neutralized, as indicated in FIG. 5 at high pressure metal hydrides at the composition state, represented by dotted line 7, due to the decrease in voltage of the first cell 32 during discharge and the increase in voltage of the second cell 58 with it being charged. The cells stabilize at state 7.

Figure 6:
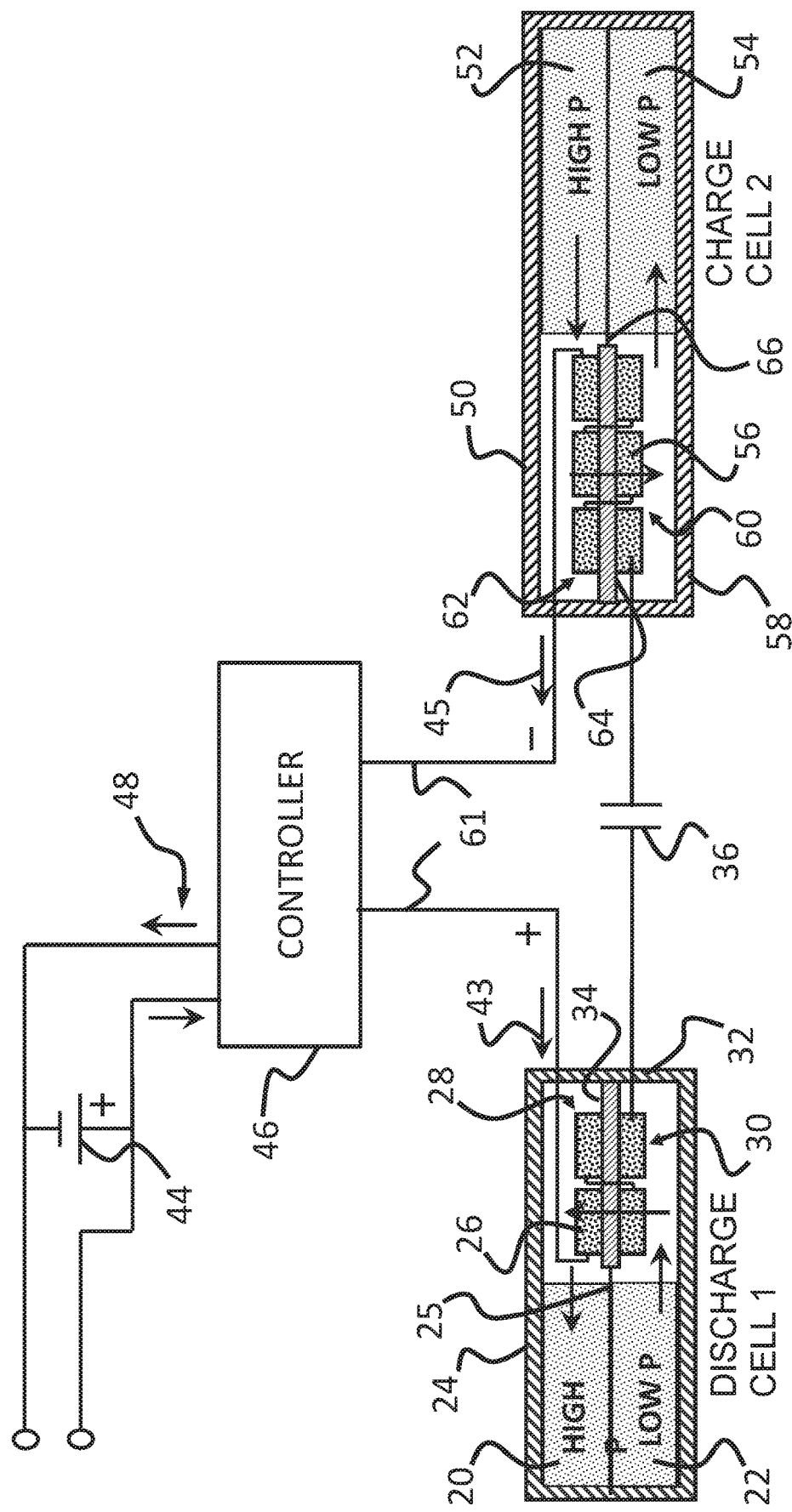
FIG. 6 is a schematic illustration of a representative example of one embodiment of the present invention that includes an energy extraction circuit (controller) and complementary thermo-galvanic cells connected back to back to each other in an electrochemical conversion system operating under a reduced ambient temperature condition at 20° C.
Figure 7:
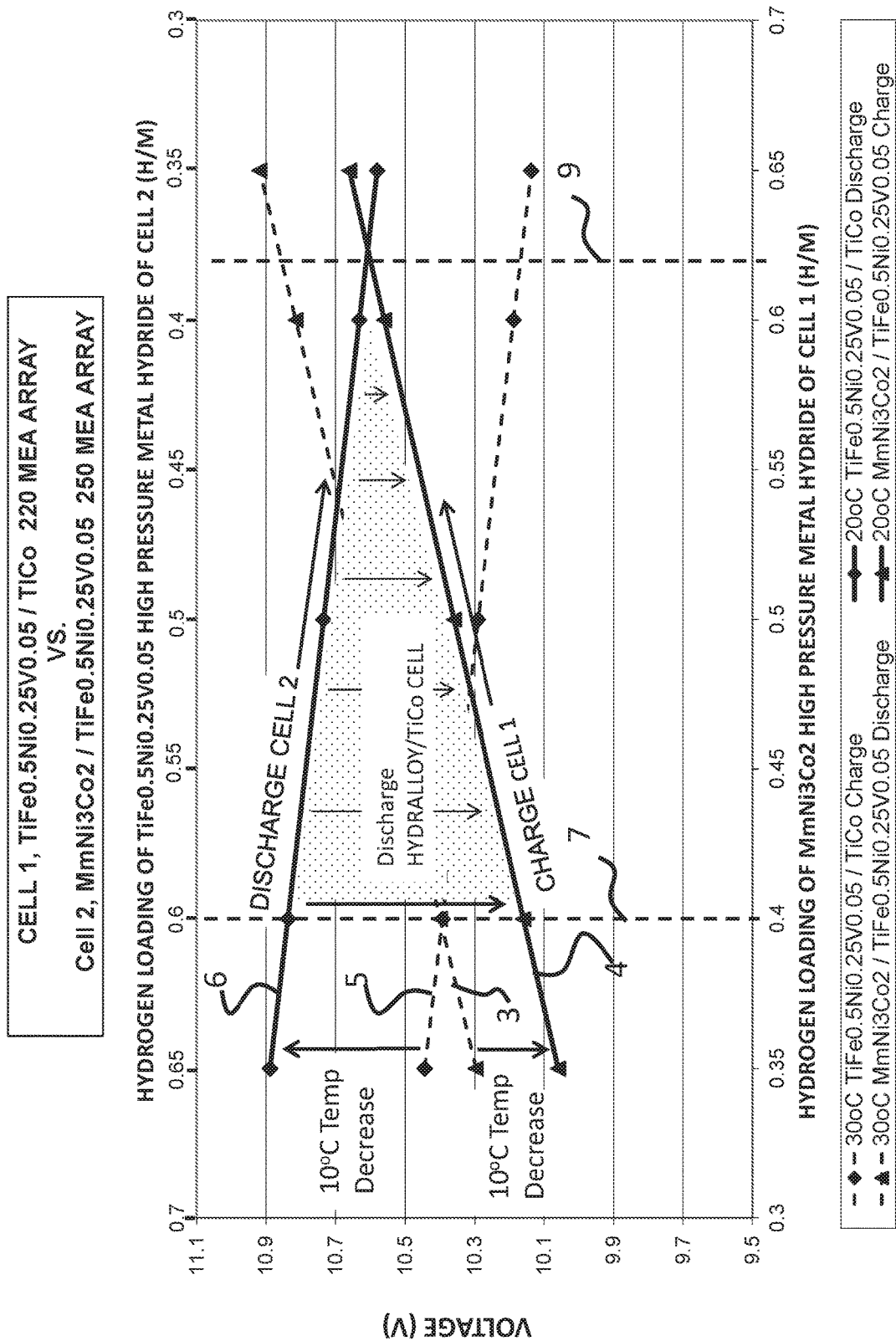
FIG. 7 is a data plot of Nernst voltage of a function of hydrogen content for a first metal hydride based electrochemical cell and a second metal hydride based electrochemical cell connected back to back to each other, wherein the high and low pressure metal-hydride pairs in each cell are selected based upon predicted, advantageous pressure differentials under a reduced ambient temperature condition, in accordance with an embodiment of the present invention.

FIG. 6 and the solid lines 4 and 6 of FIG. 7 represent operation under a 10° C. temperature decrease to 20° C. The temperature change results in the second cell 58 (see line 6 of FIG. 7) now being at a higher voltage than the first cell 32 (see line 4 of FIG. 7), as illustrated at the composition state 7 in FIG. 7. A temperature decrease will cause the first cell 32 to experience a voltage decrease because of its positive temperature-voltage coefficient as the second cell 58 experiences a voltage increase because of its negative temperature-voltage coefficient. The difference in voltage is applied to the controller 46 which can now extract power and supply it to the storage device 44 by enabling current flow from the second cell 58 to the first cell 32. Power is generated with the discharge of the second cell 58, line 6, as hydrogen is conducted through the MEA 56 from the high pressure metal hydride 52 to the low pressure metal hydride 54. Because of its now higher voltage potential, the second cell 58 forces reverse current flow through the MEA array 26 of first cell 32 (i.e., the charging cell 32, line 4), as hydrogen is pumped from the low pressure metal hydride 22 through the MEA 26 to the high pressure metal hydride 2, as illustrated by electron flow direction lines 43 and 45 of FIG. 6.

As illustrated in FIG. 7, the current flow terminates when the voltage difference between the two cells 32, 58 is neutralized at the composition state 9 with the decrease in voltage of the second cell 58 during its discharge and the increase in voltage of first cell 32 with it being charged. With the 10° C. temperature decrease back to 20° C. and their voltage difference neutralized, the cells 32, 58 are now back in their original state and ready for another temperature cycle with an amount of energy having been accumulated within the energy storage device 44.

Figure 8:
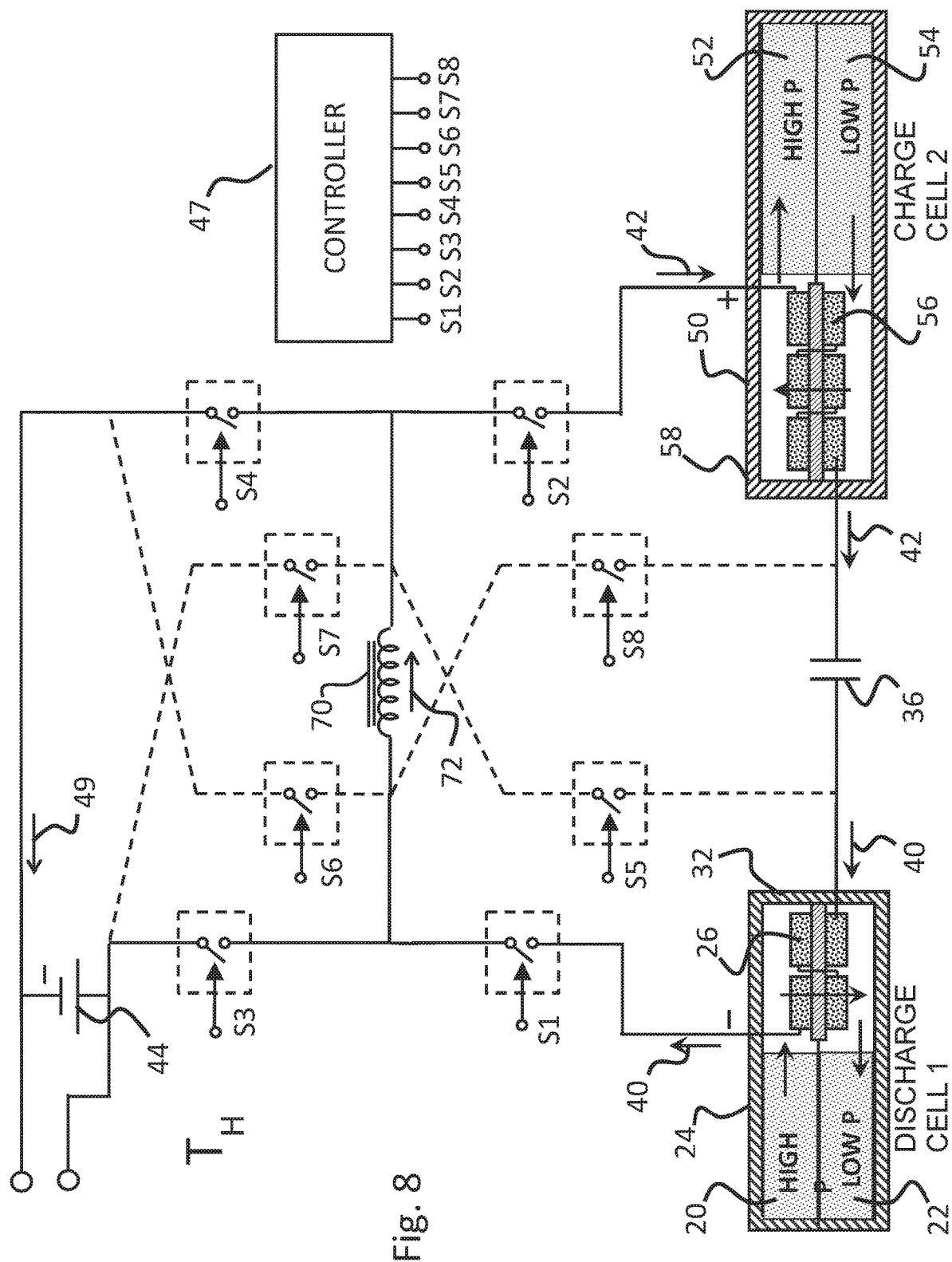
FIG. 8 is a schematic drawing of an energy extraction circuit as a controller with a boost regulator equivalent circuit for extracting ambient heat energy by discharging two back to back electrochemical cells having complementary positive and negative temperature-voltage coefficients operating under an elevated temperature condition, in accordance with an embodiment of the present invention.

FIG. 8 represents the controller 46 as a boost regulator control circuit approach for achieving the required functions of the converter. Switches S1 through S8 are coupled to and controlled by a controller 47. FIG. 8 illustrates discharge of the first cell 32 and charge of the second cell 58 with the difference in discharge and charge energy being coupled to the energy storage device 44. The controller 47 closes switches S1 and S2 momentarily to establish current flow through an inductor 70, as indicated by the arrows 40, 72 and 42 I FIG. 8. The voltage difference between the cells 32, 58 is applied across the inductor 70, thus storing energy in the inductor 70. As the controller 47 opens switches S1 and S2, it immediately closes switches S3 and S4 momentarily to couple the energy stored in the inductor 70 to the energy storage device 44, as indicated by the electron flow direction arrows 72 and 49 in FIG. 8. Controller 47 repeats the process continuously until the voltage potential difference between the two cells 32, 58 is neutralized.

Figure 9:
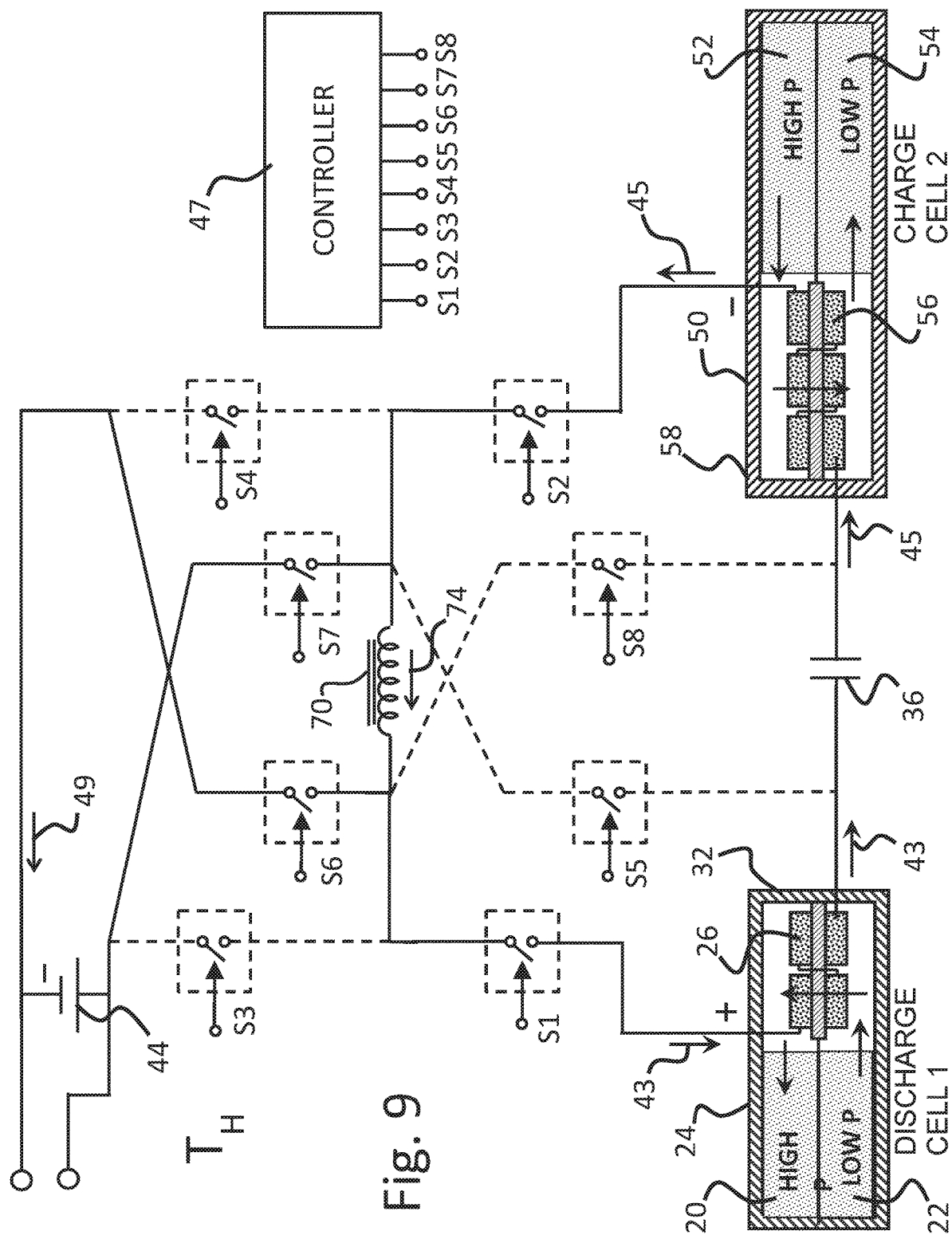
FIG. 9 is a schematic drawing of an energy extraction circuit as a controller with a boost regulator equivalent circuitry for extracting ambient heat energy by discharging two back to back electrochemical cells having complementary positive and negative temperature-voltage coefficients operating under a reduced temperature condition, in accordance with an embodiment of the present invention.

FIG. 9 illustrates the process wherein the second cell 58 is discharged and the first cell 32 is charged, with the second cell 58 now being at a higher voltage because of a 10° C. temperature decrease to 20° C. When the controller 47 momentarily closes switches S1 and S2, electrons now flow as indicated by the electron flow direction arrows 45, 74 and 43 in FIG. 9. As before, the voltage difference between the two cells 32, 58 is applied across the inductor 70, thus storing energy therein. The controller 47 opens switches S1 and S2 and immediately closes switches S6 and S7 momentarily to couple the energy stored in the inductor 70 to the energy storage device 44, as indicated by the electron flow direction arrows 74 and 49. Controller 47 repeats the process continuously until the voltage potential difference between the two cells 32, 58 is neutralized.

Generally, electrochemical cells are subject to self-discharge and other efficiency losses. The many mechanisms include conductive impedances, electronic leakage or internal short circuit, parasitic reactions between the electrolyte and active materials, and molecular diffusion. Self-discharge by molecular hydrogen diffusion through the proton conductive membrane or by electronic leakage through the proton conductive membranes could result in loss of the voltage and the voltage differential between the cells independent of a discharge-charge event or change in temperature. To compensate for a resulting loss in effectiveness due to self-discharge, controller 47 is configured to periodically recharge cell 32 and or cell 58 using a portion of the energy accumulated over time within storage device 44.

Figure 10:
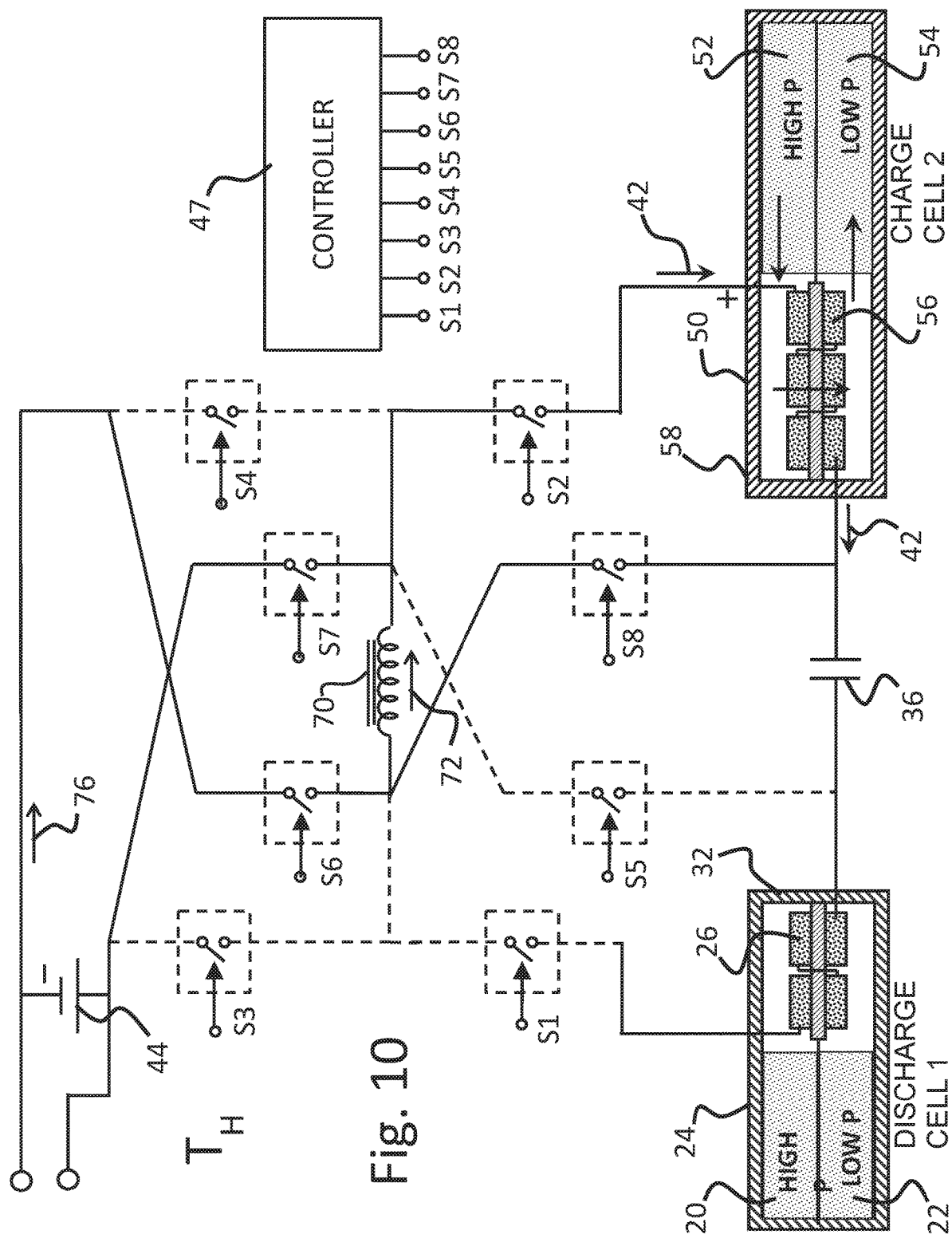
FIG. 10 is a schematic drawing of an energy extraction circuit as a controller with boost regulator equivalent circuitry, a first and a second electrochemical cell and an energy storage device configuration for recharging the first electrochemical cell to compensate for non-ideal losses in charge which may occur over time, in accordance with an embodiment of the present invention.

As illustrated in FIG. 10, the controller 47 recharges the second cell 58 by momentarily closing switches S6 and S7, causing electron flow as indicated by the electron flow direction arrows 76 and 72 in FIG. 10. With the re-opening of switches S6 and S7, the controller 47 immediately closes switches S2 and S8 momentarily to couple the energy stored in the inductor 70 to the second cell 58 as indicated by the electron flow arrows 72 and 42. The switching sequence is continued repeatedly until an adequate charge has been restored to the second cell 58.

Figure 11:
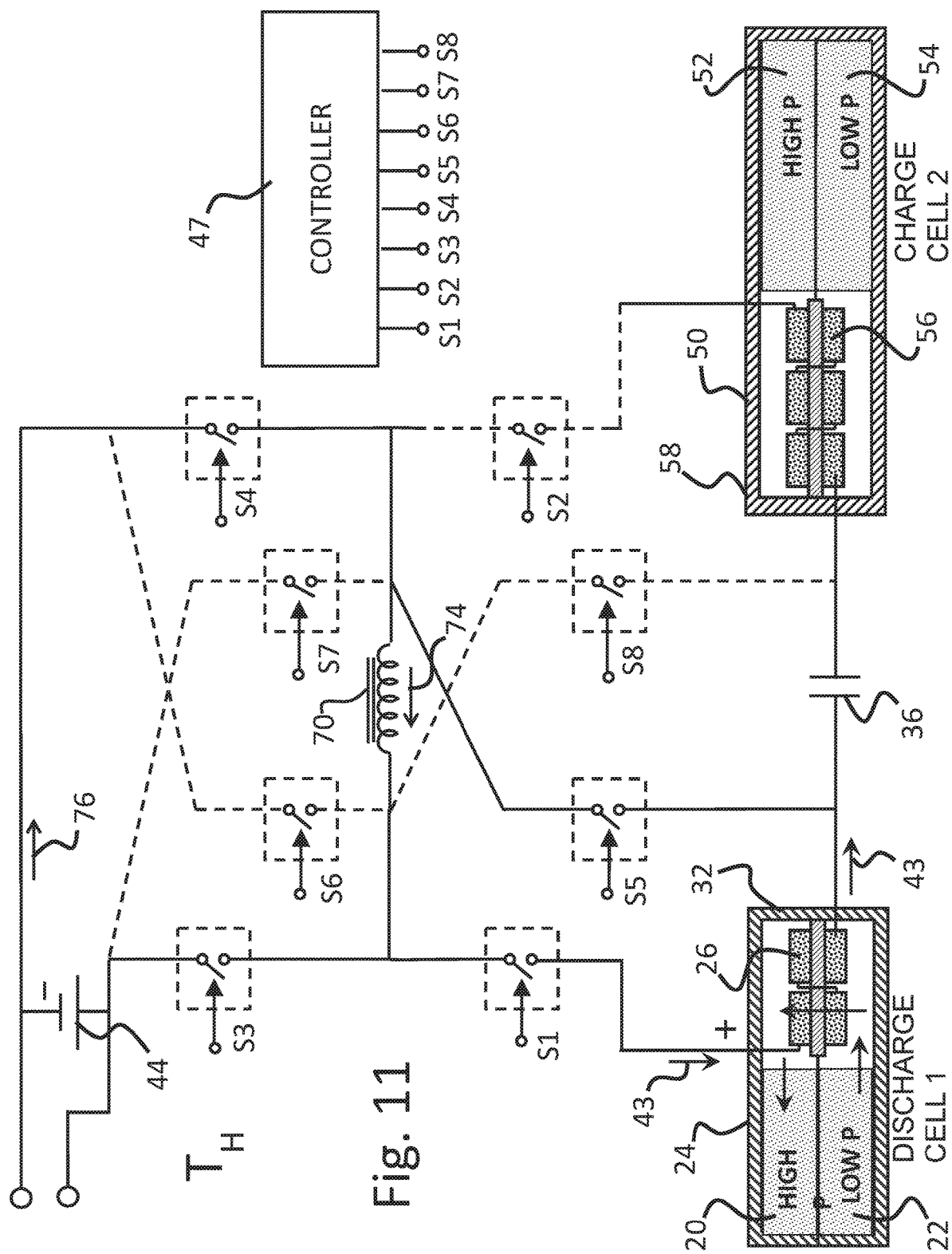
FIG. 11 is a schematic drawing of an energy extraction circuit as a controller with boost regulator equivalent circuitry, a first and a second electrochemical cell and an energy storage device configuration for recharging the first electrochemical cell to compensate for non-ideal losses in charge which may occur over time, in accordance with an embodiment of the present invention.

An equivalent process is used to recharge the first cell 32. Referring to FIG. 11, the controller 47 recharges the first cell 32 by momentarily closing switches S3 and S4, whereby energy is stored within the inductor 70 by current flow as indicated by the electron flow direction arrows 74 and 76 in FIG. 11. The controller 47 closes switches S1 and S5 instantly with its opening of switches S3 and S4, such that the energy stored within the inductor 70 is coupled to the first cell 32 as indicated by the electron flow direction arrows 74 and 43 in FIG. 11. The switching sequence is continued repeatedly until an adequate charge has been restored to the first cell 32.

In each cell 32, 58, the power produced as hydrogen passes from the high-pressure metal hydride to the low-pressure metal hydride through the MEA decreases as the pressure ratio between the two chambers decreases. Similarly, the power required to recompress hydrogen from the low-pressure hydride to the high-pressure hydride increases as the pressure ratio increases.

For the above-described operation, the 10° C. cycle may be a daily ambient temperature cycle. That is, during a 24-hour period, the difference between a high and a low ambient temperature is 10° C. During long thermal transitions such as day-night cycles, even a relatively large engine would have time to come into thermal equilibrium with its environment.

A reasonable hydrogen capacity per unit volume of a typical metal hydride is equivalent to about 1.86 Ah/cc in electrons. If the high-pressure and low-pressure chambers 20, 22 of the first cell 32 each contain 1 cm$^3$ of metal hydride per chamber, then 1.86 Ah of equivalent current could be cycled back and forth between the two chambers 20, 22. In one example, given the 220 MEAs in first cell 32, the net current output capacity would be 8.5 mAh, (1.86 mAh/220 cells). Because of the larger number (e.g., 250) of MEAs in the second cell 58, the second cell 58 would need 2.1 Ah (8.5 mAh*250) of capacity in order to match the 8.5 mAh input/output current capability of the first cell 32. This means that the metal hydrides in the high and low pressure chambers 52, 54 of the second cell 58 would need to be 1.13 cm3, (2.1 Ah/1.86 Ah/cm3) each. As can be observed from FIGS. 5 and 7, the converter shuttles about 22.5%, (0.4H/M to 0.625H/M) of the metal hydride's capacity back and forth during the 10° C. temperature cycle. This equates to 0.42 Ah (1.86 Ah*0.225) of current capacity shuttled back and forth between the two cells 32, 58. As can be seen from FIGS. 5 and 7, at the voltage neutralization composition states 7 and 9, a 10° C. temperature change creates a 0.68 volt differential between the two cells 32, 58 over the 0.42 Ah capacity range. The average mean voltage difference supplied to the controller over a discharge/charge half cycle is 0.34V, (0.68/2). Therefore, the net output energy to the controller per half cycle is 0.65 mWh, (0.42 Ah/220 MEA*0.34V) or 1.3 mWh per full 10° C. temperature increase/decrease cycle. Given the 4.26 cm3, (2*(1 cm3+1.13 cm3), of metal hydride contained in the converter, the energy density and power generated per degree of temperature change based on metal hydride volume is 31 µWh/(cm$^3$.° C.Cycle), [(1.3 mWh/4.26 cm3)/(10° C. Cycle)].

Multiple daily cycles or various magnitudes are possible and the controller system may be programmed to anticipate and respond to thermal transients that may be greater than or less than a certain value, as opposed to the 10° C. example transient disclosed herein. For example, one possible application is in a portable electronic device that may be carried on one's person into and out of buildings or other situations that change the engine's thermal environment.

Initiation of a charge/discharge cycle can be facilitated through use of a sensing system that works in conjunction with the controller to recognize when a cycle may be conducted effectively. For example, a voltage sensor or a temperature sensor may detect the ending, stabilization or leveling off of an increasing temperature transient. If the controller determines that the configuration of the engine and the magnitude of the temperature change are suitable for a charge or discharge event, then it will initiate such an event. Similarly, the event may be initiated upon the detection of a temperature change at the housing or in the ambient environment of a predetermined magnitude over a predetermined period of time. As another example, based on state of charge, a pressure sensor may detect that a predetermined pressure in a high-pressure chamber has been reached or that a predetermined pressure differential between the high-pressure chamber and the low-pressure chamber has been reached.

Heat is absorbed by a metal hydride with the release of hydrogen and heat is released by a metal hydride with hydrogen absorption. The engine may be configured to facilitate heat transfer between the chambers so as to minimize the amount of heat that must be extracted from or transferred to the environment. However, the overall effect of expansion of hydrogen from the high-pressure to low-pressure is endothermic and heat is absorbed by the engine from the elevated temperature ambient environment.

Each electrode may include a porous current collector to help facilitate the flow of hydrogen and hydrogen ions while still conducting a flow of electrons. Each electrode may include a catalyst such as platinum or a conductive metal oxide to help facilitate the hydrogen reaction at each respective electrode.

It will be appreciated by those skilled in the art that changes could be made to the embodiments described above without departing from the broad inventive concept thereof. All such changes, combinations, and variations are included herein by the scope of this disclosure and the appended claims. It is to be understood, therefore, that the present invention is not limited to the particular embodiments disclosed, but it is intended to cover modifications within the spirit and scope of the appended claims.

I claim:

1. An electrochemical conversion system comprising:
   first and second complementary rechargeable electrochemical cells, the first rechargeable electrochemical cell having a positive voltage temperature coefficient and the second rechargeable electrochemical cell having a negative voltage temperature coefficient; and
   a controller,
      wherein a voltage differential is created between the first and second complementary rechargeable electrochemical cells upon a variation in a temperature of the system, and
      wherein the controller operates to extract power from the first and second complementary rechargeable electrochemical cells under the voltage differential created by the temperature variation.

2. The electrochemical conversion system according to claim 1, wherein the two complementary rechargeable electrochemical cells are connected in reverse polarity with the controller connected between negative terminals thereof.

3. The electrochemical conversion system according to claim 1, wherein each rechargeable electrochemical cell comprises:
   a housing defining an interior;
   a substantially gas-impermeable barrier dividing said interior into a high-pressure hydrogen storage chamber and a low-pressure hydrogen storage chamber, at least a portion of the substantially gas-impermeable barrier comprising a proton conductive membrane electrode assembly, the proton conductive membrane electrode assembly comprising at least one pair of opposing electrodes and an electrolyte membrane sandwiched between the opposing electrodes; and
   a first metal hydride storage material disposed within the high-pressure hydrogen storage chamber and a second metal hydride storage material disposed within the low-pressure hydrogen storage chamber.

4. The electrochemical conversion system according to claim 3, wherein the housing comprises a substantially thermally-conductive material.

5. The electrochemical conversion system according to claim 3, wherein the first metal hydride storage material and the second metal hydride storage material of each rechargeable electrochemical cell each comprises at least one of TiCo, $TiFe_{0.5}Ni_{0.25}V_{0.05}$, $MmNi_{4.5}Nm_{0.5}$ and $MmNi_3Co_2$.

6. The electrochemical conversion system according to claim 3, wherein the first metal hydride storage material of each rechargeable electrochemical cell comprises at least one of $MnNi_3Co_2$ and $TiFe_{0.5}Ni_{0.25}V_{0.05}$ and the second metal hydride storage material of each rechargeable electrochemical cell comprises at least one of TiCo and $TiFe_{0.5}Ni_{0.25}V_{0.05}$.

7. The electrochemical conversion system according to claim 3, wherein for each rechargeable electrochemical cell, at any given temperature, the first metal-hydride storage material stores hydrogen at a first average storage pressure that is higher than a second average storage pressure at which the second metal hydride storage material stores hydrogen.

8. The electrochemical conversion system according to claim 1, further comprising an energy storage device supplied with the extracted power and recharge circuitry for coupling energy from the energy storage device to each of the rechargeable electrochemical cells in order to periodically recharge the cells.

9. An electrochemical conversion system comprising:
   first and second complementary rechargeable electrochemical cells, the first rechargeable electrochemical cell having a first voltage temperature coefficient and the second rechargeable electrochemical cell having a second voltage temperature coefficient which is different from the first voltage temperature coefficient; and
   an energy extraction circuit,
      wherein a voltage differential is created between the first and second complementary rechargeable electrochemical cells upon a variation in a temperature of the system, and
      wherein the energy extraction circuit operates to extract power from the first and second complementary rechargeable electrochemical cells under the voltage differential created by the temperature variation.

10. An electrochemical conversion system comprising:
    first and second complementary rechargeable electrochemical cells, the first rechargeable electrochemical cell having a first voltage temperature coefficient and the second rechargeable electrochemical cell having a second voltage temperature coefficient which is different from the first voltage temperature coefficient;
    an energy extraction circuit; and
    an energy storage device,
       wherein a voltage differential is created between the first and second complementary rechargeable electrochemical cells upon a variation in a temperature of the system,
       wherein the energy extraction circuit operates to extract power from the first and second complementary rechargeable electrochemical cells under the voltage differential created by the temperature variation and supply the extracted power to the energy storage device, and
       wherein the energy extraction circuit periodically recharges each of the rechargeable electrochemical cells using energy from the energy storage device.

* * * * *